(12) United States Patent
Li

(10) Patent No.: US 9,546,017 B2
(45) Date of Patent: Jan. 17, 2017

(54) MODULAR COMBINED BOX AND CONNECTING ASSEMBLY THEREOF

(71) Applicant: Tangshan Dushibao Industrial Co., Ltd., Tangshan (CN)

(72) Inventor: Shaolong Li, Beijing (CN)

(73) Assignee: Tangshan Dushibao Industrial Co., Ltd., Tangshan (CN)

( * ) Notice: Subject to any disclaimer, the term of this patent is extended or adjusted under 35 U.S.C. 154(b) by 0 days.

(21) Appl. No.: 14/390,089

(22) PCT Filed: Dec. 5, 2013

(86) PCT No.: PCT/CN2013/088651
§ 371 (c)(1),
(2) Date: Oct. 2, 2014

(87) PCT Pub. No.: WO2015/039385
PCT Pub. Date: Mar. 26, 2015

(65) Prior Publication Data
US 2016/0214761 A1 Jul. 28, 2016

(30) Foreign Application Priority Data
Sep. 22, 2013 (CN) .......................... 2013 1 0432758

(51) Int. Cl.
*B65D 6/00* (2006.01)
*F16B 12/22* (2006.01)
(Continued)

(52) U.S. Cl.
CPC . *B65D 7/12* (2013.01); *B65D 9/34* (2013.01); *B65D 11/20* (2013.01); *F16B 7/0486* (2013.01);
(Continued)

(58) Field of Classification Search
CPC .............. B65D 7/32; B65D 7/30; B65D 7/24; B65D 7/12; B65D 9/34; B65D 9/24; B65D 9/22; B65D 9/12; B65D 11/20; B65D 11/1873; B65D 11/1866; B65D 11/18; B65D 21/0235; B65D 21/0204; B65D 21/0201; B65D 21/02; F16B 7/0486; F16B 7/048; F16B 7/044; F16B 7/18; F16B 12/22; F16B 7/0473; E05D 7/10; E05D 7/1061; E05D 7/1066; E05D 7/1044; E05D 7/105; E05D 5/02; E05D 5/0238; E05D 5/04; E05D 5/14; E05D 5/16
(Continued)

(56) References Cited

U.S. PATENT DOCUMENTS 2,047,909 A * 7/1936 North .................... E05D 3/02
16/250
3,188,686 A * 6/1965 Orcutt .................... E05D 5/128
16/263
(Continued)

FOREIGN PATENT DOCUMENTS

CN 2777262 Y 5/2006
CN 201412421 Y 2/2010
(Continued)

OTHER PUBLICATIONS

International Search Report From PCT/CN2013/088651 (Non-English), mailed Jun. 18, 2014.
(Continued)

*Primary Examiner* — Robert J Hicks
(74) *Attorney, Agent, or Firm* — Calfee, Halter & Griswold LLP

(57) ABSTRACT

A connecting assembly of modular box, comprising a top cover, a sleeve, a mandrel, and a jacket, the sleeve is configured to trap outside the mandrel; the sleeve is pro-
(Continued)

vided with at least one snap-fit portion, the jacket is provided with at least one snap-engagement portion, the at least one snap-engagement portion is connected with the at least one snap-fit portion, so that the jacket is fixed in a circumferential direction of the sleeve; the top cover is connected to an upper end of the mandrel to press firmly the sleeve and the jacket, so that the axial positions of the sleeve and the jacket are fixed.

14 Claims, 12 Drawing Sheets

(51) Int. Cl.
*B65D 6/34* (2006.01)
*F16B 7/18* (2006.01)
*F16B 7/04* (2006.01)

(52) U.S. Cl.
CPC .............. *F16B 7/18* (2013.01); *F16B 12/22* (2013.01); *F16B 7/0473* (2013.01)

(58) Field of Classification Search
USPC ............ 220/4.34, 4.33, 4.28, 691, 682, 677; 206/509, 512, 508, 507, 505, 504, 600, 206/386; 217/12 R, 13; 16/250, 254, 260, 16/261, 262, 263, 265, 266, 270, 271, 16/272, 386, 387, 388
See application file for complete search history.

(56) References Cited

U.S. PATENT DOCUMENTS

| | | | |
|---|---|---|---|
| 3,670,899 A | 6/1972 | Kronenberg et al. | |
| 4,002,261 A * | 1/1977 | Litchfield ........... | A47B 88/0014 220/4.33 |
| 4,570,291 A * | 2/1986 | Smith ................. | E05D 11/0054 16/250 |
| 5,991,975 A * | 11/1999 | Baer .................... | E05D 7/009 16/250 |
| 6,202,367 B1 | 3/2001 | Marino | |
| 2009/0199365 A1* | 8/2009 | Svensson ............ | E05D 5/12 16/386 |

FOREIGN PATENT DOCUMENTS

| | | | | |
|---|---|---|---|---|
| CN | 203584986 U | 5/2014 | | |
| DE | 1994083 U | 9/1968 | | |
| FR | 2958674 A3 | 10/2011 | | |
| FR | 2977615 A3 | 1/2013 | | |
| GB | 2064055 A | 6/1981 | | |
| GB | 2187228 A * | 9/1987 | .............. | E05D 5/08 |

OTHER PUBLICATIONS

Written Opinion From PCT/CN2013/088651 (Non-English), mailed Jul. 16, 2014.

* cited by examiner

MODULAR COMBINED BOX AND CONNECTING ASSEMBLY THEREOF

CROSS-REFERENCE TO RELATED APPLICATION

This application is the U.S. national phase entry of PCT/CN2013/088651, with an international filing date of 5 Dec. 2013, which claims the benefit of Chinese Application No. 201310432758.8, with a filing date of 22 Sep. 2013, the entire disclosures of which are fully incorporated herein by reference.

TECHNICAL FIELD

The prevent invention relates to a modular box and its connecting assembly for connection and mounting, in particular, to a modular box and its connecting assembly which may be quickly assembled and detached.

BACKGROUND

There are various ways to connect a combined box currently. One is to use a metal pillar with its four sides having connection chucking slots or holes through which boxboards are fixed on the pillar, the disadvantages of this connection are as follows: (a) a particular connector needs to be fixed on a boxboard, or faces of the boxboard are machined as having a shape adapted to a chucking slot on the pillar, so it is cumbersome in mounting and labour-intensive; (b) the combination style of the box is unitary due to the limitation of the structure of the connecting pillar; (c) the fixation of the box to the ground is troublesome; (d) four sides of the connecting pillar have chucking slots, affecting the appearance.

Another is to use an extrusion having a docking, rectangular, or three-way configuration as a connector, a mandrel is provided in a centre hole of the connector, by which the plates between the different layers are overlapped with each other to form a higher box. Compared to the previous solution, this connection is adjustable in height, mounting is relatively easy, but its drawbacks are: (a) combination style is unitary due to the limitation by the structure of the connecting pillar; (b) the fixation of the box to the ground is troublesome.

More and more requirements are made on the combination style of the box in the actual use, but the existing combined box and connector only provide a 1+1 connection or some fixed-angle connections, which limits the diversity and flexibility of the box style.

SUMMARY

In order to solve the problems present in prior art such as complicated mounting procedures, troublesome fixing to the ground, and less box combination styles, the present invention provides a new modular box and connecting assembly thereof, its technical solution is as follows.

A connecting assembly of modular box includes a top cover, a sleeve, a mandrel, and a jacket, the sleeve is configured to trap outside the mandrel; the sleeve is provided with at least one snap-fit portion, the jacket is provided with at least one snap-engagement portion, the at least one snap-engagement portion is connected with the at least one snap-fit portion, so that the jacket is fixed in the circumferential direction of the sleeve; the top cover is connected to an upper end of the mandrel to firmly press the sleeve and the jacket, so that the axial positions of the sleeve and the jacket are fixed.

Perfectly, the connecting assembly further includes a bottom cover which is connected to a lower end of the mandrel.

Perfectly, the connecting assembly further includes a ground anchor which is connected to a lower end of the mandrel.

Furthermore, the bottom cover or the ground anchor is connected to the lower end of the mandrel by a connection selected from threaded, hinged, glued, riveted, pinned, bonded, and welded connections; the top cover is connected to the lower end of the mandrel by a connection selected from threaded, hinged, glued, riveted, pinned, bonded, and welded connections.

In addition, the bottom cover is used to fix the connecting assembly on a hard foundation. The ground anchor has a tip at its lower portion, and an anchor body of the ground anchor has sawteeth, and the ground anchor is used to fix the connecting assembly on a soft foundation.

One of the at least one snap-fit portion or the at least one snap-engagement portion may be arranged as a plurality of chucking holes or slots distributed uniformly in a circumferential direction, and the other one of the at least one snap-fit portion or the at least one snap-engagement portion may be arranged as at least one bump.

One end of the mandrel is a flange, the other end of the mandrel is a recess, and the flange of one mandrel may be connected to a recess of another mandrel.

One end of the sleeve is a flange, the other end of the sleeve is a recess, and the flange of one sleeve may be connected to a recess of another sleeve.

A modular box, includes side plates and a connecting assembly, the side plates are connected by the connecting assembly and fixed on a jacket.

The modular box may have a plurality of mandrels connected with each other, the modular box may have a plurality of sleeves connected with each other, the top cover is connected to an upper end of the topmost mandrel, and a lower end of the bottommost mandrel is connected to the bottom cover or the ground anchor.

Optionally, the material of side plates of the box may be wood, plastics, composite, metal or other material.

Optionally, the material of the connecting assembly may be wood, plastics, metal, composite or other material.

The present invention may solve the problems present in the background, to achieve rapid assembly and disassembly of modular box, and may support a variety of complicated styles of assembly requirements, and adapt to different foundation fixation construction conditions.

With such a solution, easier mounting of box is allowed, the sleeve may rotate freely and coaxially relative to the mandrel at any angle, more groups of uniformly distributed snap-engagement or snap-fit components are provided on the circumference of the sleeve or mandrel, achieving an connecting effect of mounting multiple plates on an mounting pivot point (sleeve) simultaneously, so that the combined box may be combined arbitrarily depending on design requirements, to achieve the modularized and liberalized assembly form.

In addition, due to the match of the snap-engagement component or the snap-fit component, the position of the jacket in the circumferential direction of the sleeve may be fixed. The top cover firmly presses the sleeve and the jacket through a mechanical connection, so that the axial positions of the sleeve and the jacket are fixed.

Figure 1:
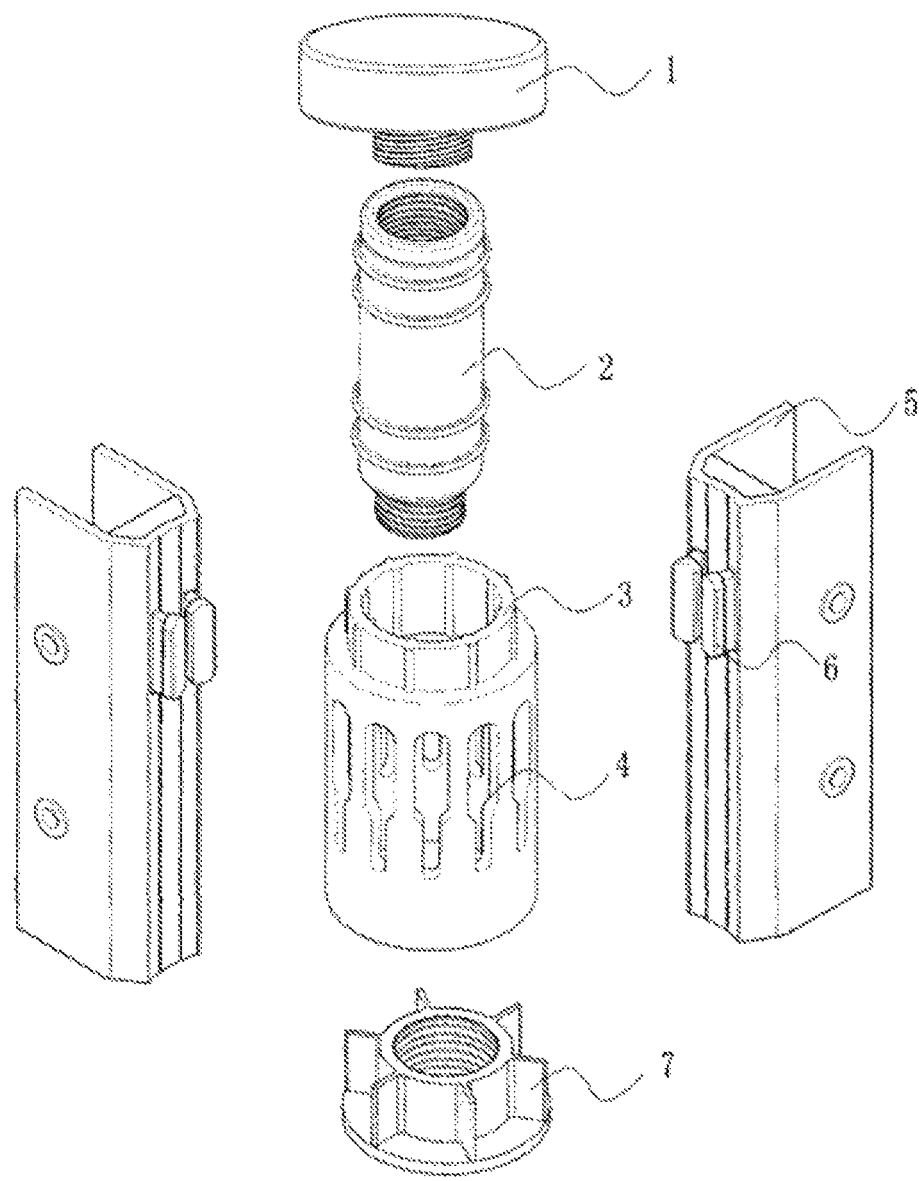
FIG. 1 is a combination schematic diagram of a connecting assembly according to a first embodiment of the present invention.

In the figures, top cover 1, mandrel 2, sleeve 3, chucking hole 4, jacket 5, chucking head 6, bottom cover 7, ground anchor 8, side plate 9 are shown.

DESCRIPTION OF EMBODIMENTS

The present invention is specifically described below with reference to the drawings.

As shown in FIG. 1, a connecting assembly of a modular box according to a first embodiment of the present invention consists of a top cover 1, a mandrel 2, a sleeve 3, a jacket 5, and a bottom cover 7. The bottom cover 7 is screwedly fixed to the mandrel 2 by a threaded connection, the bottom cover 7 is used to fix the connecting assembly on a hard foundation; the sleeve 3 is provided with a plurality of chucking holes 4, and is configured to trap outside the mandrel 2; the jacket 5 is provided with a chucking head 6, the chucking head 6 is shaped to match the chucking hole 4 of the sleeve 3 to be snapped into engagement with the sleeve 3, in order to achieve the circumferential positioning of the jacket 5 and the sleeve 3; the top cover 1 is screwedly fixed to an upper end of the mandrel 2 by a threaded connection, so that the sleeve 3 and the jacket 5 are pressed down firmly, resulting in a fixed axial position of the sleeve 3 and the jacket 5. And, the top cover 1 has a groove to receive a flange at the upper end of the sleeve 3. The groove is specifically shown in FIG. 12.

As can be seen from FIG. 1, the chucking head 6 of the jacket 5 matches the chucking hole 4 of the sleeve 3, so that the jacket 5 may be snap-fitted on the sleeve 3. As there are many same chucking holes 4 distributed uniformly on the outer circumference of the sleeve 3, allowing a plurality of jackets 5 to be snap-fitted on the same sleeve 3 simultaneously, and the snap-fitted location is also optional, i.e., multiple box side plates may be mounted simultaneously to enhance the diversity of combination.

The bottom cover 7 is used to fix the entire assembly on a hard foundation similar to a concrete, for example, the bottom cover 7 may be placed directly on the foundation, or is fixed on the foundation by using an expansion bolt via the hole in the bottom cover 7. In addition, the bottom cover 7 shown in FIG. 1 has a plurality of blade components; the outer diameter of the blade components matches the inner diameter of the lower end of the sleeve 3. Such blades are mainly used for expanding the outer diameter of the bottom cover 7, so as to strengthen the strength of connection with the sleeve 3, to reduce the insertion resistance of the sleeve simultaneously, to strengthen the structural strength of the middle threaded portion in order to enhance the strength of connecting the bottom cover 7 with the mandrel 2, and to reduce the amount of material used simultaneously.

A side plate 9 of the modular box may be fixed in a U-shaped groove of the jacket 5 by screws or other connection means.

In addition to the threaded connection, the bottom cover 7 may also be connected to the lower end of the mandrel 2 by a connection selected from hinged, glued, riveted, pinned, bonded, welded connections, or other mechanical connection means.

Similarly, the top cover 1 may also be connected to the upper end of the mandrel 2 by a connection selected from hinged, glued, riveted, pinned, bonded, welded connections, or other mechanical connection means.

In FIG. 1, the jacket 5 is provided with two chucking heads 6, and a plurality of chucking holes 4 are distributed uniformly on the sleeve 3 in a circumferential direction. Obviously, the jacket 5 may also be provided with the chucking holes, and a plurality of chucking heads are distributed uniformly on the outer circumferential surface of the sleeve 3, which can achieve the circumferential positioning of the jacket 5 and the sleeve 3 as well.

Figure 2:
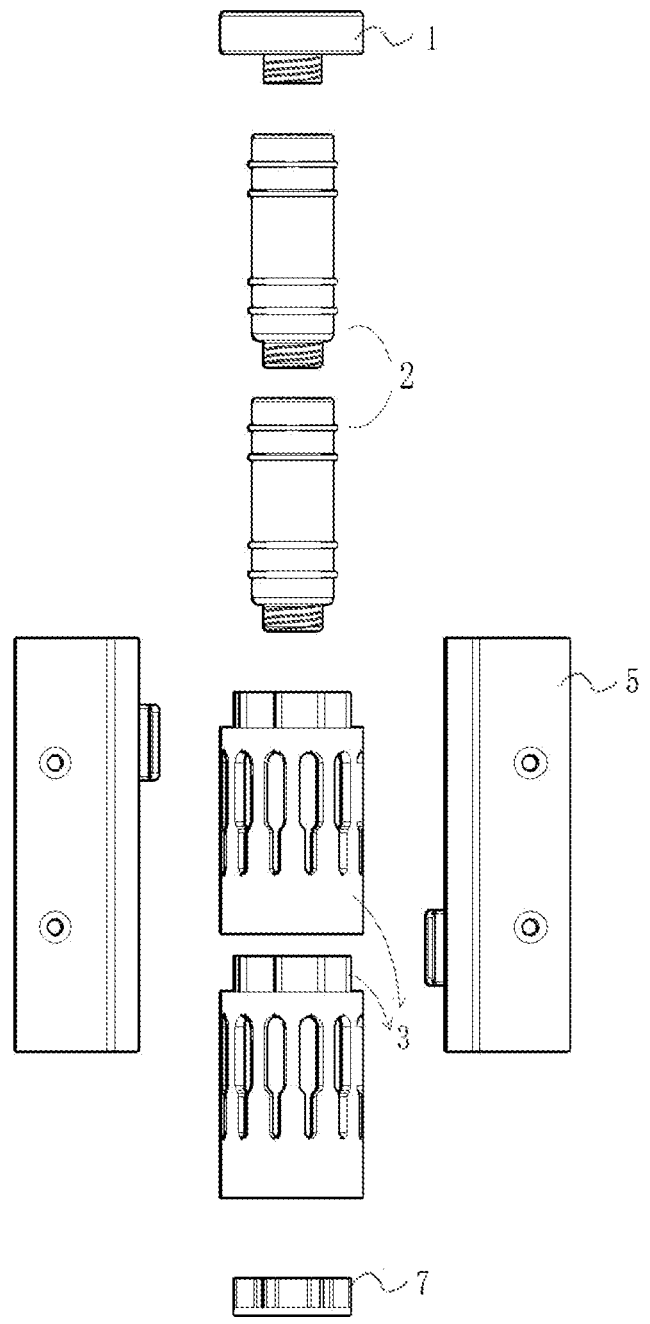
FIG. 2 is a combination schematic diagram of a connecting assembly using a bottom cover according to a second embodiment of the present invention.

A connecting assembly according to a second embodiment of the present invention is shown in FIG. 2. The mandrel 2 is provided with an external thread at its lower portion, and an internal thread at its upper portion. Such a structure also allows connection of a mandrel 2 and another mandrel 2 by a thread. The bottommost mandrel 2 is screwedly connected with the bottom cover 7, and the topmost mandrel 2 is screwedly connected with the top cover 1, in order to achieve a combination and fixation of the connecting shaft of the box. The sleeve 3 is configured to trap outside the mandrel 2, and may rotate freely around the circumference of the central axis of the mandrel 2, while a sleeve 3 may be snap-fitted with a recess (not shown in FIG. 2) at the bottom of another sleeve 3 by a flange at the top of the sleeve 3 to achieve the connection and the extension of the sleeve.

Obviously, it can be seen from FIG. 2, a plurality of small ribs may be distributed uniformly on an outer circumferential surface of the flame at the top of the sleeve 3, the role of ribs is to reduce bonding area between the adjacent components on the premise that the top cover 1 is coaxially and firmly connected with the top of the sleeve 3 or two adjacent sleeves 3 are coaxially and firmly connected, so as to facilitate the coaxial rotation between two adjacent components.

As can be seen from FIG. 2 further, the chucking head 6 of the jacket 5 matches the chucking hole 4 of the sleeve 3, so that the jacket 5 may be snap-fitted on the sleeve 3. As there are many same chucking holes 4 distributed uniformly on the outer circumference of the sleeve 3, a plurality of jackets 5 are allowed to be snap-fitted on the same sleeve 3 simultaneously, and the snap-fitted location is also optional, i.e., multiple box side plates may be mounted simultaneously to enhance the diversity of combination. Since the height of the sleeve 3 is the same as that of the mandrel 2, the height of the jacket 5 is twice the height of the sleeve 3, such a height difference may further realize the free adjustment of an angle between the jackets 5 fixed on two adjacent sleeves 3, which greatly enriches the assembly flexibility of the combined box. For example, when mounted, the chucking heads 6 of one or more jackets 5 may be caught in chucking holes 4 of a lower sleeve 3; while one or more jackets 5 are turned over for 180 degrees, so that chucking heads 6 thereof are caught in chucking holes 4 of an upper sleeve 3.

Figure 12:
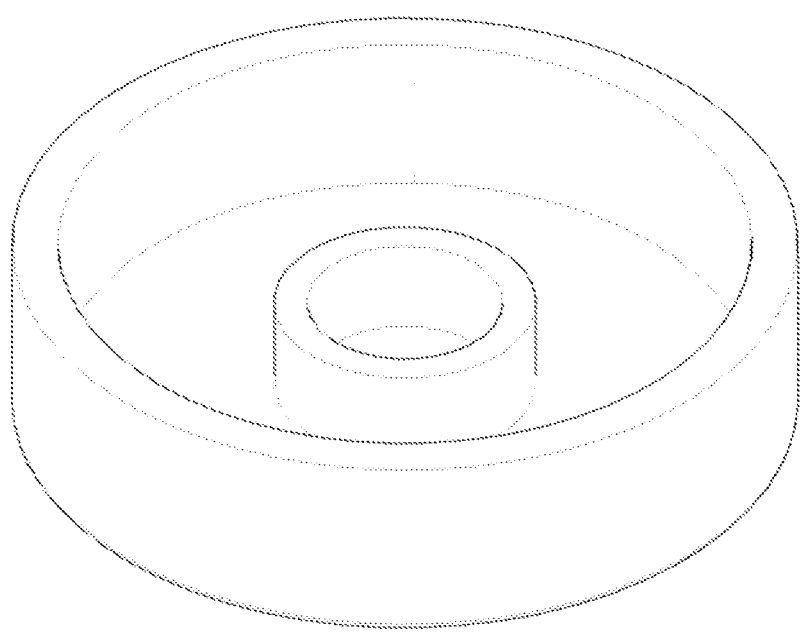
FIG. 12 is a schematic perspective diagram of a top cover according to the present invention.

At the top of such a connecting assembly, the top cover 1 and the topmost mandrel 2 are threadably connected, and the top cover 1 has a groove to accommodate a flange at the upper end of the sleeve 3. The groove is shown in FIG. 12.

Further, an outer edge of the top cover 1 may press a portion of the jacket 5, which limits the degree of freedom of the longitudinal movement of the jacket 5 along the central axis direction of the sleeve 3 to ensure that the jacket 5 may be firmly fixed to the sleeve 3 without being easily pulled out, which ensures the completeness and fastness of the modular box.

Figure 3:
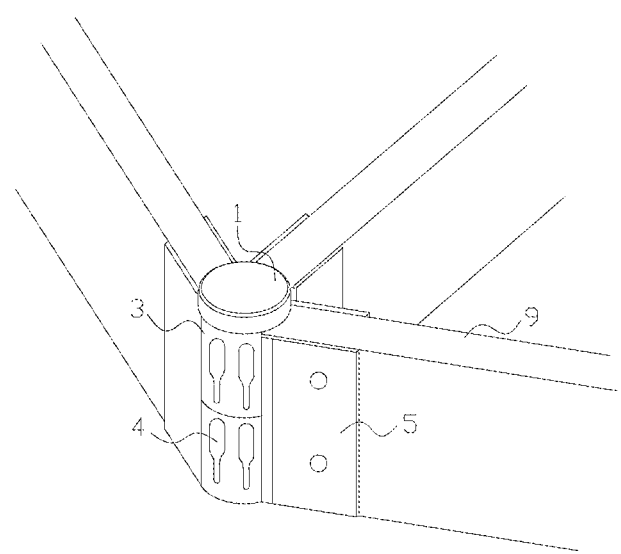
FIG. 3 is a state diagram of a modular box according to the first embodiment of the present invention after mounting.

The mounting process of the present invention is shown in FIG. 3: first the bottom cover 7 or a ground anchor 8 is fixed on the corresponding foundation, and the mandrel 2 is screwed tightly with the bottom cover 7 or the ground anchor 8, and the subsequent mandrels 2 are screwed with the mandrels 2 below one by one according to the overall assembly requirements, then the corresponding sleeve 3 is configured to trap outside the mandrel 2, and snap-fitted with the adjacent sleeve 3 in place, and then the side plates 9 are fixed, and snap-fitted into the corresponding holes of the sleeve 3 according to combination requirement of the solution, and finally the top cover 1 is screwed with the topmost mandrel 2.

Figure 4A:
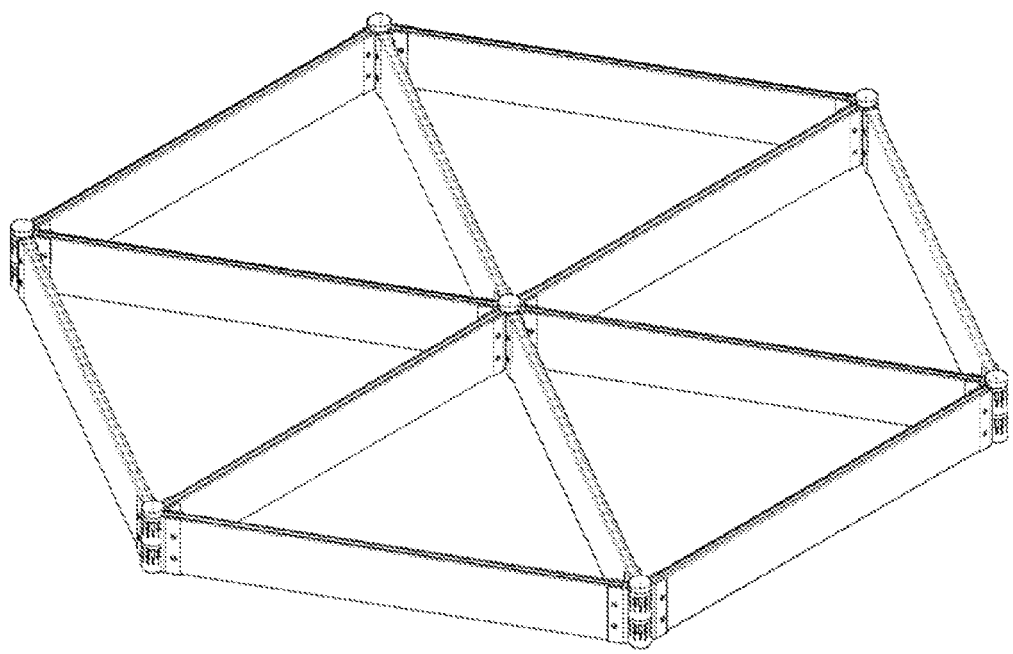
FIG. 4a illustrates an application example of the modular box according to the first embodiment of the present invention.
Figure 4B:
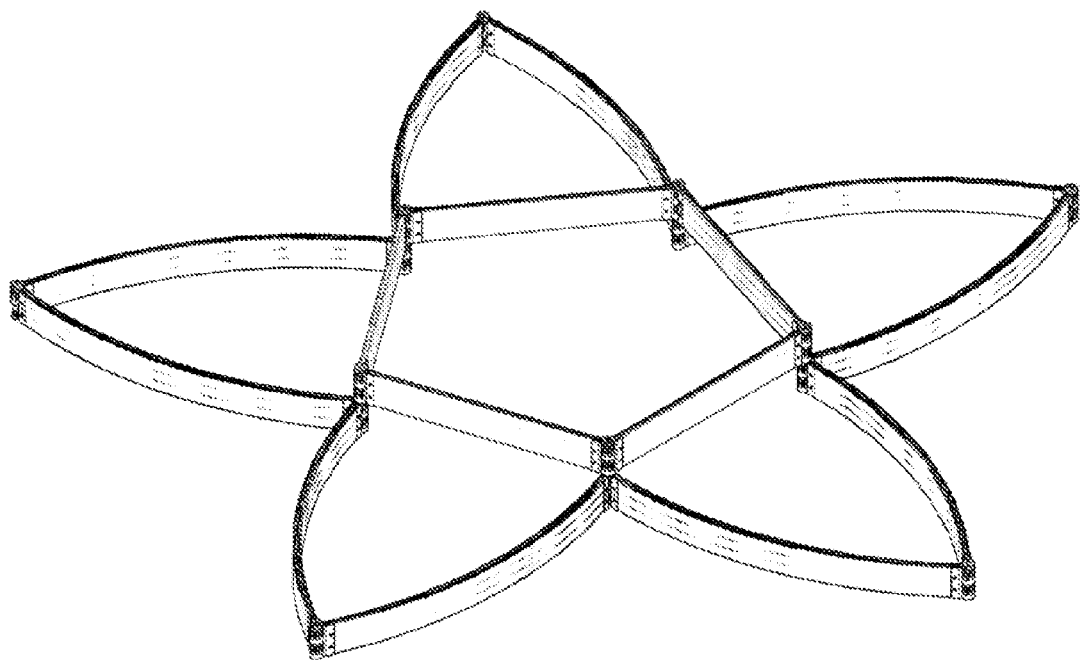
FIG. 4b illustrates another application example of the modular box according to the first embodiment of the present invention.
Figure 5A:
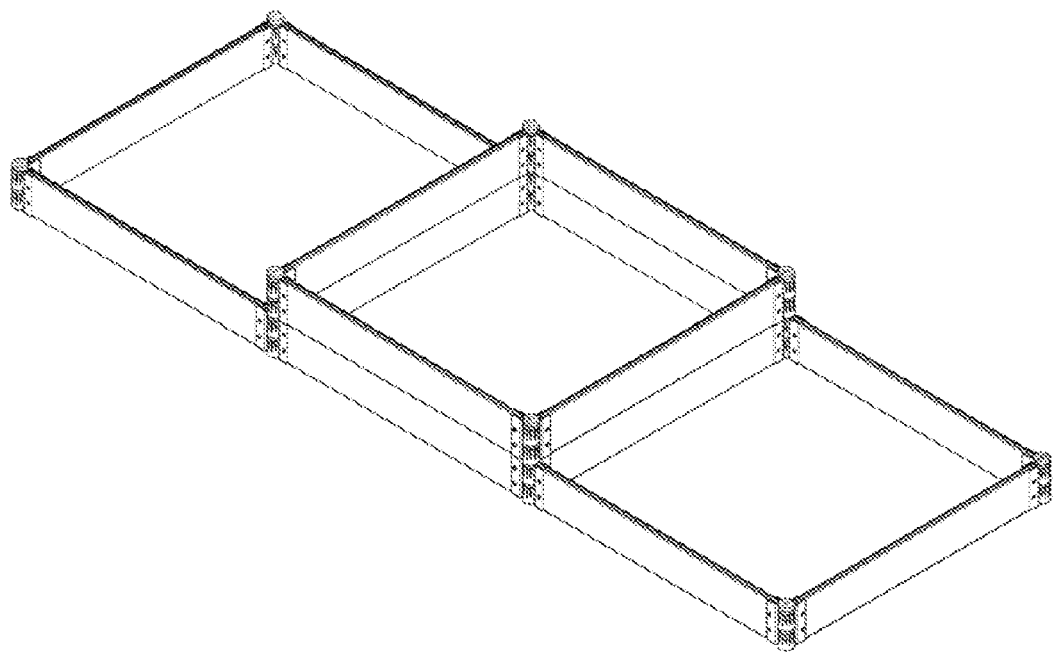
FIG. 5a illustrates an application example of the modular box according to the second embodiment of the present invention.
Figure 5B:
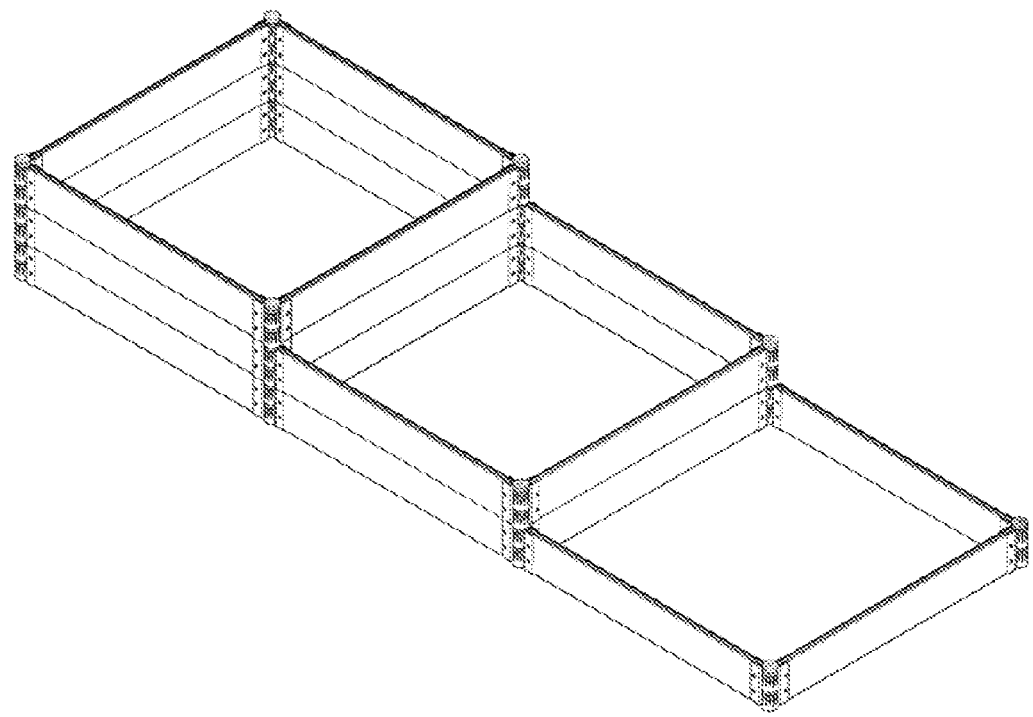
FIG. 5b illustrates another application example of the modular box according to the second embodiment of the present invention.

FIGS. 4a and 4b illustrate examples of application of a single-layer modular box according to a first embodiment of the present invention. FIGS. 5a and 5b illustrate examples of application of a multilayer modular box according to a second embodiment of the present invention. In FIGS. 4a and 4b, a single layer box is used, a plurality of side plates are fixed at one connection point simultaneously, resulting in a more diverse and more beautiful combination pattern; in FIGS. 5a and 5b, a multi-layer box is used, which shows a pattern characteristic of multiple layers at one point. Obviously, the present invention may achieve rapid assembly and disassembly, replacement or relocation, support a variety of complex patterned assembly requirements, and adapt to different foundation fixation conditions, greatly reduce the labour costs and use-cost, meet the requirement for recycling use, resource conservation, and reduction of energy consumption due to repetitive production; and meet the needs of mounting the fixed side plates made of different materials.

Figure 6:
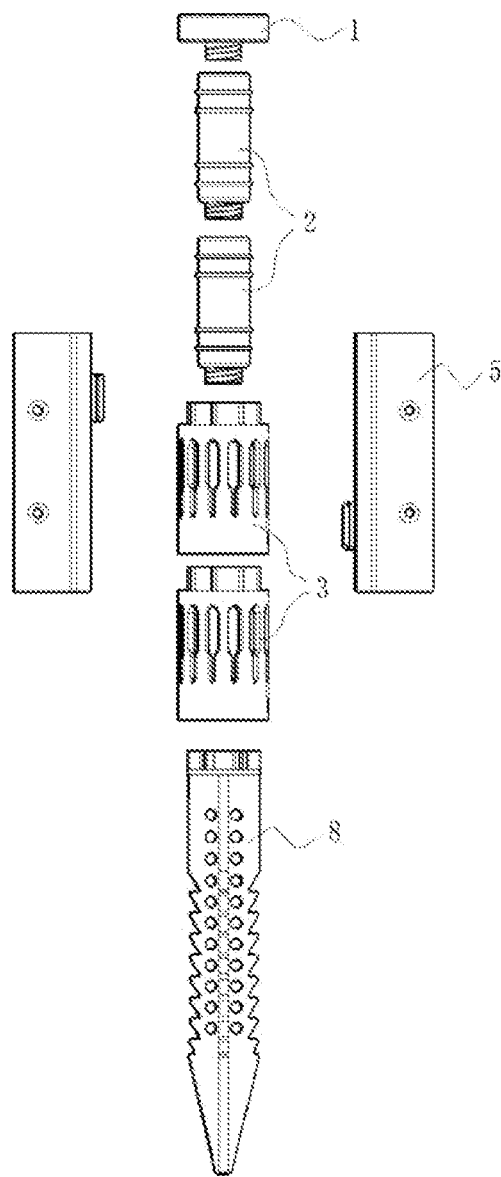
FIG. 6 is a combination schematic diagram of a connecting assembly using a ground anchor according to a third embodiment of the present invention.

FIG. 6 is a combination schematic diagram of a connecting assembly using a ground anchor according to a third embodiment of the present invention. As shown in FIG. 6, a ground anchor 8 may be used instead of the bottom cover 7. The ground anchor 8 is used for fixing the entire assembly on a soft foundation similar to the earth, and the ground anchor 8 is knocked into the foundation by direct use of a tool such as a rubber hammer. The ground anchor 8 has a tip at its lower portion, with an anchor body having sawteeth connected with threads at the bottom of the mandrel 2. The sawteeth of the anchor body allow the connecting assembly fixed in the soil based soft ground surface even better, which are less likely to be pulled out.

Figure 7:
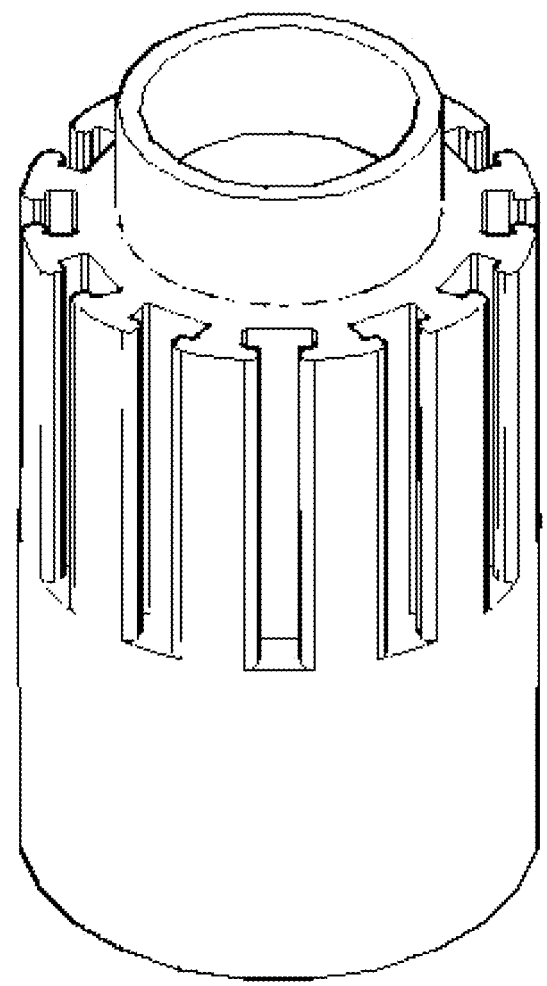
FIG. 7 is a schematic diagram of a sleeve according to a fourth embodiment of the present invention.

In order to reduce production cost, the chucking hole on the outer circumference of the sleeve 3 may be replaced with a spline groove in the present invention. As shown in FIG. 7, a plurality of T-slots may be distributed uniformly on an outer circumferential surface of the sleeve 3 according to a fourth embodiment of the present invention, the chucking head 6 on the jacket 5 may be snapped into engagement within these T-slots. Obviously, compared with the chucking hole 4 of the first embodiment, the production cost of the T-slot may be further reduced.

Furthermore, in the present invention, the rib provided on an outer circumferential surface at the upper end of the sleeve 3 may be cancelled, instead of increasing an inward projected rib on the inner circumferential surface at its lower end, the inward projected rib may play the same role as the rib shown in FIG. 2, to ensure that two adjacent sleeves have a connection coaxality, i.e., the two adjacent sleeves are in close connection, and may rotate coaxially.

Figure 8:
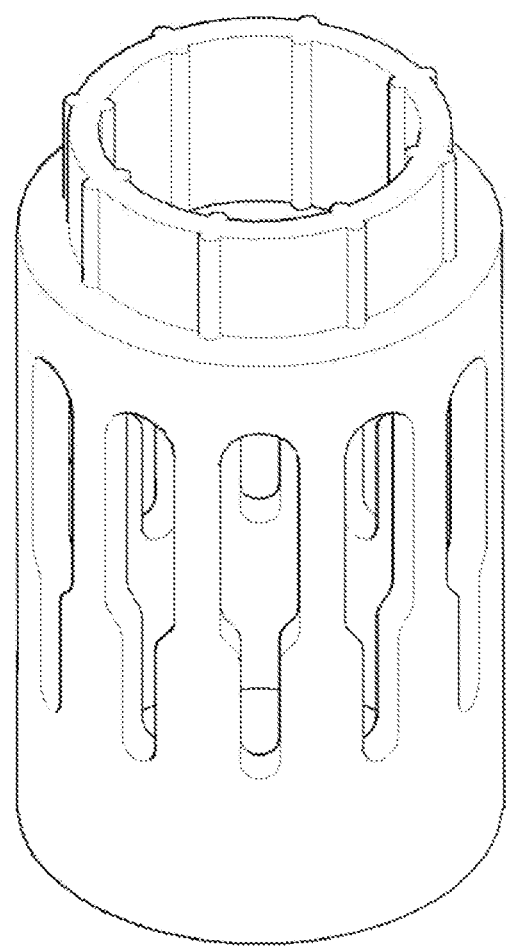
FIG. 8 is a schematic diagram of a sleeve according to a fifth embodiment of the present invention.

Further, a sleeve according to a fifth embodiment of the present invention is shown in FIG. 8, the upper outer and inner circumferential surface may be simultaneously provided with the ribs, and the function of rib of the inner circumferential surface is to interact with the outer projection perpendicular to the axis of the mandrel to ensure that the two components can be tightly integrated in this area, so as to make the outer sleeve and the jacket centered on the centre axis capable of tightly engaging with the mandrel, which avoids loosening due to a gap between the outer sleeve and the jacket and the mandrel, but taking the degree of difficulty in mounting into account, and the diameter of the inner circle of the sleeve is not made the same as the outer circle of the mandrel directly, in order to reduce the friction between each other when mounting for ease of mounting. Similarly, the outer diameter of the mandrel is not made the same as the inner diameter of the upper end of the sleeve, in order to reduce the contact area to reduce friction. When the two components are fixed cooperatively, one is a vertical rib, the other one is a transverse rib, which ensures close fitting between each other, and reduces friction between each other.

Figure 9:
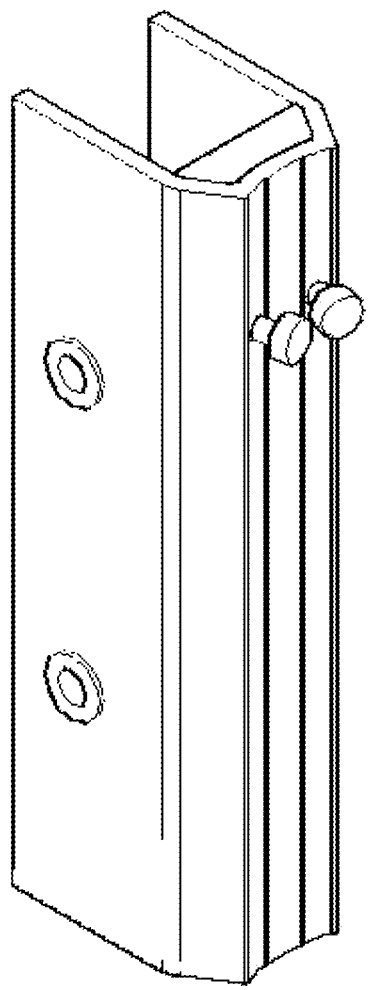
FIG. 9 is a schematic diagram of a jacket according to a sixth embodiment of the present invention.

Further, in the present invention, the chucking head 6 provided on the jacket 5 may take a variety of shapes. As shown in FIG. 9, a jacket 5 according to a sixth embodiment of the present invention is provided with a plurality of circular chucking heads 6, this shape facilitates the engagement of the chucking heads 6 with T-slots on the sleeve 3 according to the fourth embodiment of the present invention.

Figure 10:
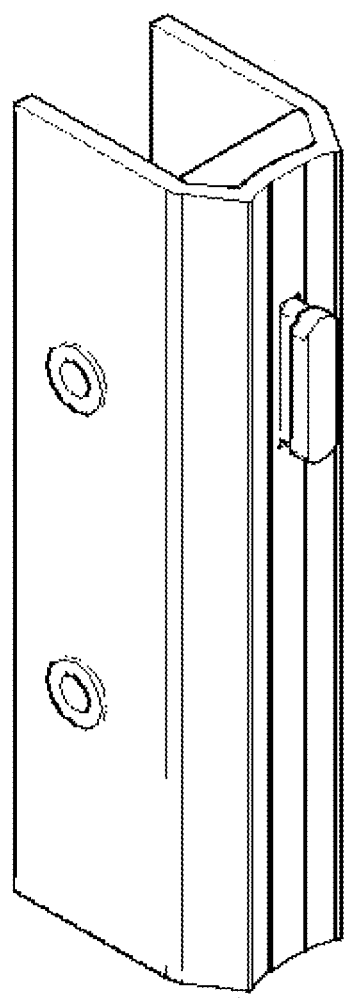
FIG. 10 is a schematic diagram of a jacket according to a seventh embodiment of the present invention.
Figure 11:
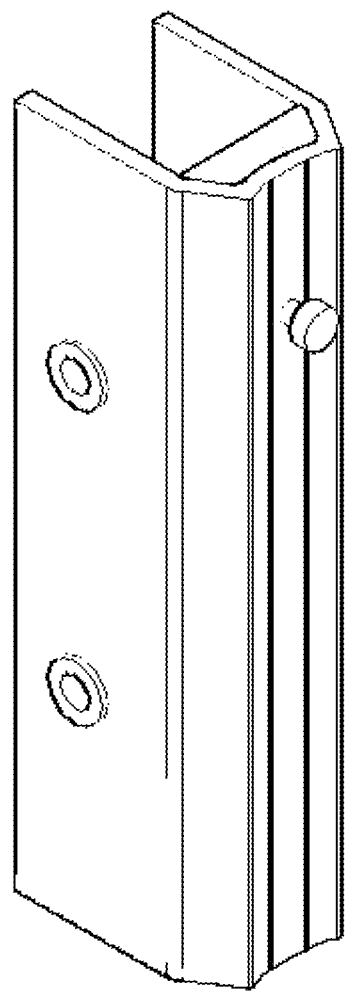
FIG. 11 is a schematic diagram of a jacket according to an eighth embodiment of the present invention.

Furthermore, multiple or single chucking head(s) 6 may be used in the present invention. As shown in FIG. 10, a jacket 5 according to a seventh embodiment of the present invention is provided only with one elongated chucking head 6. As shown in FIG. 11, a jacket 5 according to an eighth embodiment of the present invention is only provided with one circular chucking head 6.

Obviously, the chucking hole or slot may also be provided on the jacket 5, and a plurality of chucking heads are distributed uniformly on the outer circumferential surface of the sleeve 3, which may realize the circumferential positioning of the jacket 5 and the sleeve 3 as well.

The present invention has the following beneficial effects: the present invention may be used for connecting the modular box for rapid assembly and disassembly, replacement or relocation, supporting a variety of complex patterned assembly requirements and adapting to different foundation fixation conditions, greatly reducing the labour costs and use-cost and also meeting the requirement for recycling use, resource conservation, reduction of energy consumption due to repetitive production; and meeting the needs of fixing the fixed side plates made of different materials, which greatly reduces the chance of the emergence of the problem of usage of plastic materials due to its variability.

The invention claimed is:

1. A connecting assembly of a modular box, comprising:
   a mandrel having an upper end and a lower end,
   a sleeve having at least one snap-fit portion and deposited outside the mandrel,
   a jacket having at least one snap-engagement portion, wherein the snap-engagement portion is coupled to the snap-fit portion of the sleeve, wherein the jacket is fixed to the sleeve in a circumferential direction, and
   a top cover coupled to the upper end of the mandrel and pressed against the sleeve and the jacket.

2. The connecting assembly according to claim 1 further comprising a bottom cover coupled to the lower end of the mandrel.

3. The connecting assembly according to claim 2, wherein the bottom cover is coupled to the lower end of the mandrel by a connection selected from threaded, hinged, glued, riveted, pinned, bonded, and welded connections, the top cover is coupled to the lower end of the mandrel by a connection selected from threaded, hinged, glued, riveted, pinned, bonded, and welded connections.

4. The connecting assembly according to claim 1 further comprising a ground anchor coupled with the lower end of the mandrel.

5. The connecting assembly according to claim 4, wherein the ground anchor is coupled to the lower end of the mandrel by a connection selected from threaded, hinged, glued, riveted, pinned, bonded, and welded connections.

6. The connecting assembly according to claim 4, wherein the ground anchor comprises a tip at its lower portion and an anchor body having sawteeth.

7. The connecting assembly according to claim 1, wherein the snap-fit portion is a hole or a slot, and the snap-engagement portion is a bump.

8. The connecting assembly according to claim 1, wherein the snap-engagement portion is a hole or a slot, and the snap-fit portion is a bump.

9. The connecting assembly according to claim 1, wherein one end of the mandrel has a flange, the other end of the mandrel has a recess, and the flange of the mandrel is configured to connect with a recess of another mandrel.

10. The connecting assembly according to claim 1, wherein one end of the sleeve has a flange, the other end of the sleeve has a recess, the flange of the sleeve is configured to connect with a recess of another sleeve.

11. A modular box, comprising:
    at least two connecting assemblies, wherein each connecting assembly comprises:
    a mandrel having an upper end and a lower end,
    a sleeve having at least one snap-fit portion and deposited outside the mandrel,
    a jacket having at least one snap-engagement portion, wherein the snap-engagement portion is coupled to the snap-fit portion of the sleeve, so that the jacket is fixed with the sleeve in a circumferential direction,
    a top cover coupled to the upper end of the mandrel and pressed against the sleeve and the jacket, so that the sleeve and the jacket are axially fixed, and
    at least two side plates configured to be connected by the connecting assemblies and fixed on the jacket, wherein the mandrels of the connecting assemblies are connected to each other, the sleeves of the connecting assemblies are connected to each other, the top cover is coupled to the upper end of the topmost mandrel.

12. The modular box according to claim 11, wherein the connecting assembly further comprises a bottom cover, the lower end of the bottommost mandrel is configured to couple with the bottom cover.

13. The modular box according to claim 11, wherein the connecting assembly further comprises a ground anchor, the lower end of the bottommost mandrel is configured to couple with the ground anchor.

14. The modular box according to claim 11, wherein the material of the side plates and the connecting assemblies is one of wood, plastics, composite, or metal.

* * * * *